: US008016685B2

(12) United States Patent
Kurosu

(10) Patent No.: US 8,016,685 B2
(45) Date of Patent: Sep. 13, 2011

(54) POWER TRANSMISSION APPARATUS

(75) Inventor: Yoshihiro Kurosu, Gunma (JP)

(73) Assignee: Ogura Clutch Co., Ltd., Kiryu-shi, Gunma (JP)

( * ) Notice: Subject to any disclaimer, the term of this patent is extended or adjusted under 35 U.S.C. 154(b) by 584 days.

(21) Appl. No.: 12/009,562

(22) Filed: Jan. 18, 2008

(65) Prior Publication Data

US 2008/0194340 A1 Aug. 14, 2008

(30) Foreign Application Priority Data

Feb. 8, 2007 (JP) ................................. 2007-029475

(51) Int. Cl.
*F16D 3/70* (2006.01)

(52) U.S. Cl. .......................................... 464/38; 464/71

(58) Field of Classification Search ............... 464/37–39, 464/70–72, 89–91, 100, 101, 45, 46; 192/56.55, 192/56.56; 474/70, 902
See application file for complete search history.

(56) References Cited

U.S. PATENT DOCUMENTS

| | | | | |
|---|---|---|---|---|
| 2,167,705 A | * | 8/1939 | Batten | 464/71 X |
| 2,386,017 A | * | 10/1945 | Venditty | 464/89 |
| 3,897,859 A | * | 8/1975 | Norcia | 464/71 X |
| 6,200,221 B1 | | 3/2001 | Maejima et al. | |

FOREIGN PATENT DOCUMENTS

| | | |
|---|---|---|
| DE | 19960322 A1 | 7/2000 |
| DE | 10297374 B4 | 1/2008 |
| JP | 2003-035321 A | 2/2003 |
| JP | 2003-056595 A | 2/2003 |

OTHER PUBLICATIONS

Office Action issued Jan. 28, 2011 by the German Patent and Trade Mark Office (DPMA) in German Application Serial No. 10 20080 00117, Office Action, 3pgs. (with English Translation of pp. 2 and 3 of the Office Action—3pgs.).

\* cited by examiner

*Primary Examiner* — Greg Binda
(74) *Attorney, Agent, or Firm* — Schwegman, Lundberg & Woessner, P.A.

(57) ABSTRACT

In a power transmission apparatus, a driving rotary body is rotated by power from a driving device. A driven rotary body includes a driven rotary member attached to a rotating shaft of a driven device and a holding plate attached to the driven rotary member. A damper mechanism includes a cylindrical elastic member attached to the driving rotary body and a connecting member which is engaged in the elastic member to be movable forward/backward. At least one rotation transmission member is attached to the connecting member, has one end connected to the driving rotary body through the damper mechanism and the other end separably connected to the driven rotary body, and transmits rotation of the driving rotary body to the driven rotary body. A preset load setting member is mounted between the driven rotary body and the connecting member to elastically deform the rotation transmission member, thus applying a preset load.

2 Claims, 16 Drawing Sheets

FIG.4A
FIG.4B
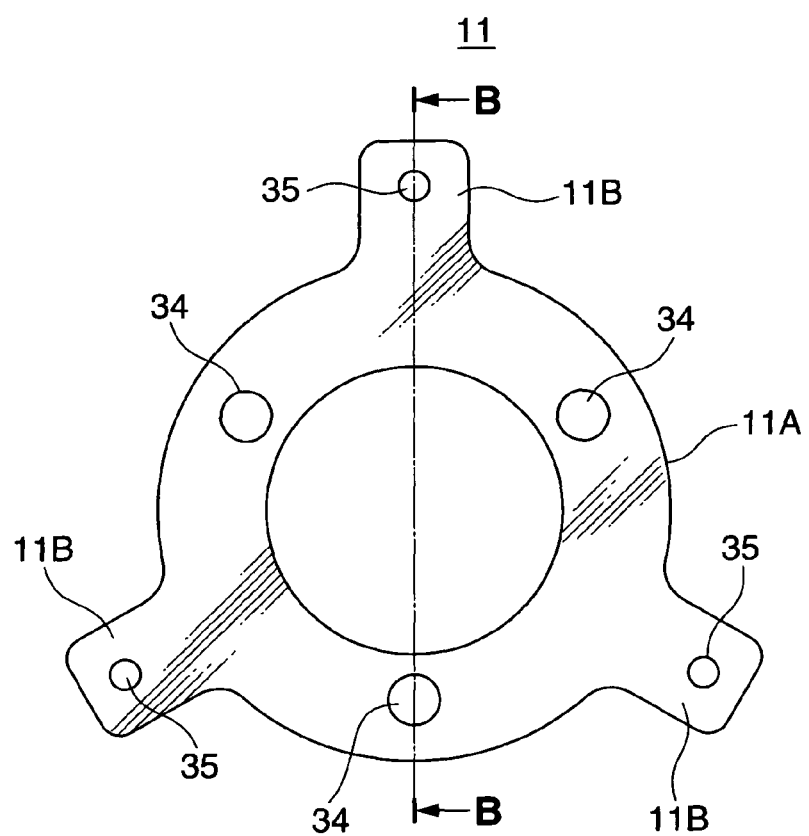
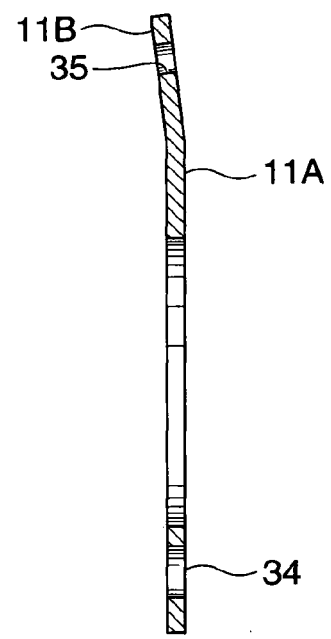

POWER TRANSMISSION APPARATUS

RELATED APPLICATION

This application claims priority under 119 to Japanese Application No. 029475/2007, filed Feb. 8, 2007, which application is incorporated herein by reference.

BACKGROUND OF THE INVENTION

The present invention relates to a power transmission apparatus disposed on a power transmission path between a driving device and driven device and added with a torque limiter function of disconnecting power transmission when an overload acts.

Various types of power transmission apparatuses are conventionally proposed to be used in a compressor for an automobile air conditioner or the like. As shown in U.S. Pat. No. 6,200,221 and Japanese Patent Laid-Open No. 2003-56595, a power transmission apparatus of this type comprises a damper mechanism. Rotation of a driving rotary body is transmitted to a driven rotary body through the damper mechanism.

In a conventional power transmission apparatus shown in FIG. 16, reference 2 denotes a compressor (driven device) for an automobile air conditioner; 3, a housing for the compressor 2, 4, a pulley (driving rotary body) which is rotatably mounted on a cylindrical portion 3A of the housing 3 through a bearing 5; 6, a rotating shaft of the compressor 2; 7, a hub (driven rotary member) mounted on the rotating shaft 6; 8, a rotation transmission member which connects the pulley 4 to the hub 7; 9, a damper mechanism which connects the pulley 4 to the rotation transmission member 8; and 11, a holding plate 11 which constitutes a driven rotary body 12 together with the hub 7. These constituent elements constitute a power transmission apparatus 1 of the compressor 2.

The rotation transmission member 8 comprises an almost disc plate-like main body 8A, a plurality of fixing portions 8B projecting from the outer periphery of the main body 8A equidistantly in a circumferential direction, arcuate connecting portions 8C extending from the respective fixing portions 8B along the outer periphery of the main body 8A and elastically deformable in the direction of thickness, and connecting portions 8D extending from the distal ends of the respective connecting portions 8C. In the rotation transmission member 8, a set screw 10 fixes the corresponding fixing portion 8B to the pulley 4 through the damper mechanism 9. Elastic deformation of the connecting portion 8C interposes the corresponding connecting portion 8D between holding portions 7C and 11B of the hub 7 and holding plate 11 to releasably hold the connecting portion 8D.

The damper mechanism 9 serves to absorb the shock or torque fluctuations during power transmission and comprises an elastic member (to be referred to as a rubber damper hereinafter) 16 and connecting member 19. The damper mechanism 9 comprises, e.g., three damper mechanisms 9 built into a damper holding member 15 equiangularly in the circumferential direction. The damper holding member 15 is disposed in an annular recess 17 of the pulley 4 and has three storing portions 18 which respectively store the corresponding damper mechanisms 9. The rubber damper 16 forms a cylinder with two open ends and is built into the corresponding storing portion 18 together with the connecting member 19. The connecting member 19 forms a flanged cylinder having female threads, and the rubber damper 16 is fitted on its outer surface. The set screw 10 fixes the fixing portion 8B of the corresponding rotation transmission member 8 to the front end face (hub-side end face) of the connecting member 19, so a flange 19A provided at the rear end of the connecting member 19 urges the rubber damper 16 against the inner surface of a disc plate 4A of the pulley 4.

In this power transmission apparatus, power from the automobile engine (driving device) is transmitted to the rotating shaft 6 through the pulley 4, damper mechanisms 9, rotation transmission member 8, and driven rotary body 12.

In the damper mechanism 9, the rubber damper 16 effectively absorbs the torque fluctuations or shock transmitted from the pulley 4 to the driven rotary body 12 during power transmission. Thus, a tension that acts on the connecting portion 8D of the rotation transmission member 8 due to the torque fluctuations or shock during power transmission is reduced, and the connecting portion 8D will not come out from the portion between the hub 7 and holding plate 11.

When an overload acts on the compressor 2 side, it suppresses rotation of the rotating shaft 6 to generate a rotation force equal to or more than a predetermined magnitude between the pulley 4 and hub 7. This rotation force disconnects the pulley 4 and hub 7 that have been connected by the rotation transmission member 8. More specifically, when rotation of the rotating shaft 6 is suppressed, the rotation force generated between the pulley 4 and hub 7 releases the connecting portions 8D of the rotation transmission member 8 from the portion between the holding portions 7C and 11B of the hub 7 and holding plate 11 to disconnect the pulley 4 and driven rotary body 12 from each other. The connecting portions 8C are then elastically restored to move the connecting portions 8D to the rear side of the holding plate 11. Therefore, once the connecting portions 8D are released, the rotation transmission member 8 and driven rotary body 12 do not interfere with each other, and rotation transmission from the pulley 4 to the rotating shaft 6 can be readily disconnected.

In the conventional power transmission apparatus 1 described above, the holding portions 7C and 11B of the hub 7 and holding plate 11 releasably hold the connecting portions 8D of the rotation transmission member 8. The connecting portions 8C are elastically deformed toward the pulley 4, and the set screws 10 fix the fixing portions 8B to the connecting members 19 of the damper mechanisms 9. Thus, the elastic restoration force of the connecting portions 8C acts on a bearing (not shown) that axially supports the rotating shaft 6 as a rightward thrust load. Consequently, the rotation resistance of the bearing increases to result in the loss of the driving energy of the compressor 2. The elastic restoration force of the connecting portions 8C also acts on the bearing 5 that axially supports the pulley 4 as a thrust load in a direction (leftward in FIG. 16) opposite to that described above.

As a conventional apparatus in which the above problems are solved, a power transmission mechanism disclosed in Japanese Patent Laid-Open No. 2003-56595 is known. In this power transmission mechanism, a hub and rotation transmission member hold the head of a torque transmission pin (connecting member) which constitutes a damper mechanism together with a rubber damper. A pin main body is pressed into the rubber damper to be movable forward/backward. The hub has a groove where the head of the pin escapes when an overload acts.

In this arrangement, when an overload acts on the compressor side, the rotation of the rotating shaft is suppressed to generate a rotation force equal to or larger than a predetermined magnitude between a pulley and the hub. This rotation force releases the connecting portion of the rotation transmission member from a portion between the hub and a holding plate, thereby disengaging the pulley and hub from each other. When the connecting portion is released from the portion between the hub and holding plate, the elastic restoration force of the connecting portion extracts the pin main body of the torque transmission pin from the rubber damper, and the head of the pin moves to the groove in the hub. Thus, the pulley idles to disconnect power transmission from the engine to the compressor. As a result, the load on the engine on the compressor side can be eliminated.

In this structure, the pin main body of the torque transmission pin is pressed into the rubber damper to be movable forward/backward. Thus, the elastic restoration force of the connecting portion of the rotation transmission member does not act as a thrust load on bearings that support the rotation shaft and pulley, thereby solving the above problems.

In the conventional power transmission apparatus, however, when an overload acts, the pin main body of the torque transmission pin is extracted from the rubber damper and the head of the pin is moved to the groove of the hub. To connect the torque transmission pin and rubber damper firmly, the pin main body of the torque transmission pin must be long, the head of the pin must be thick, and the groove must be deep. This increases the size of the apparatus in the axial direction. As a result, the apparatus cannot be made compact.

If the pin main body is long, to support the thick head of the torque transmission pin with the fixing portion of the rotation transmission member, the span of the connecting portion must be long to increase the elastic deformation amount. This increases the size of the rotation transmission member.

SUMMARY OF THE INVENTION

It is an object of the present invention to provide a power transmission apparatus in which the loss of the driving energy of a driven device can be reduced.

It is another object of the present invention to provide a power transmission apparatus that can be made low-profile and compact and can be assembled easily.

In order to achieve the above objects, according to the present invention, there is provided a power transmission apparatus comprising a driving rotary body which is rotated by power from a driving device, a driven rotary body including a driven rotary member attached to a rotating shaft of a driven device and a holding plate attached to the driven rotary member, a damper mechanism including a cylindrical elastic member attached to said driving rotary body and a connecting member which is engaged in the elastic member to be movable forward/backward, at least one rotation transmission member to which the connecting member is attached, one end of which is connected to the driving rotary body through the damper mechanism and the other end of which is separably connected to the driven rotary body, and which transmits rotation of the driving rotary body to the driven rotary body, and a preset load setting member mounted between the driven rotary body and the connecting member to elastically deform the rotation transmission member, thus applying a preset load.

BRIEF DESCRIPTION OF THE DRAWINGS

FIG. 4A is a front view of a holding plate shown in FIG. 2;

FIG. 4B is a sectional view taken along the line B-B of FIG. 4A;

DESCRIPTION OF THE PREFERRED EMBODIMENTS

Figure 16:
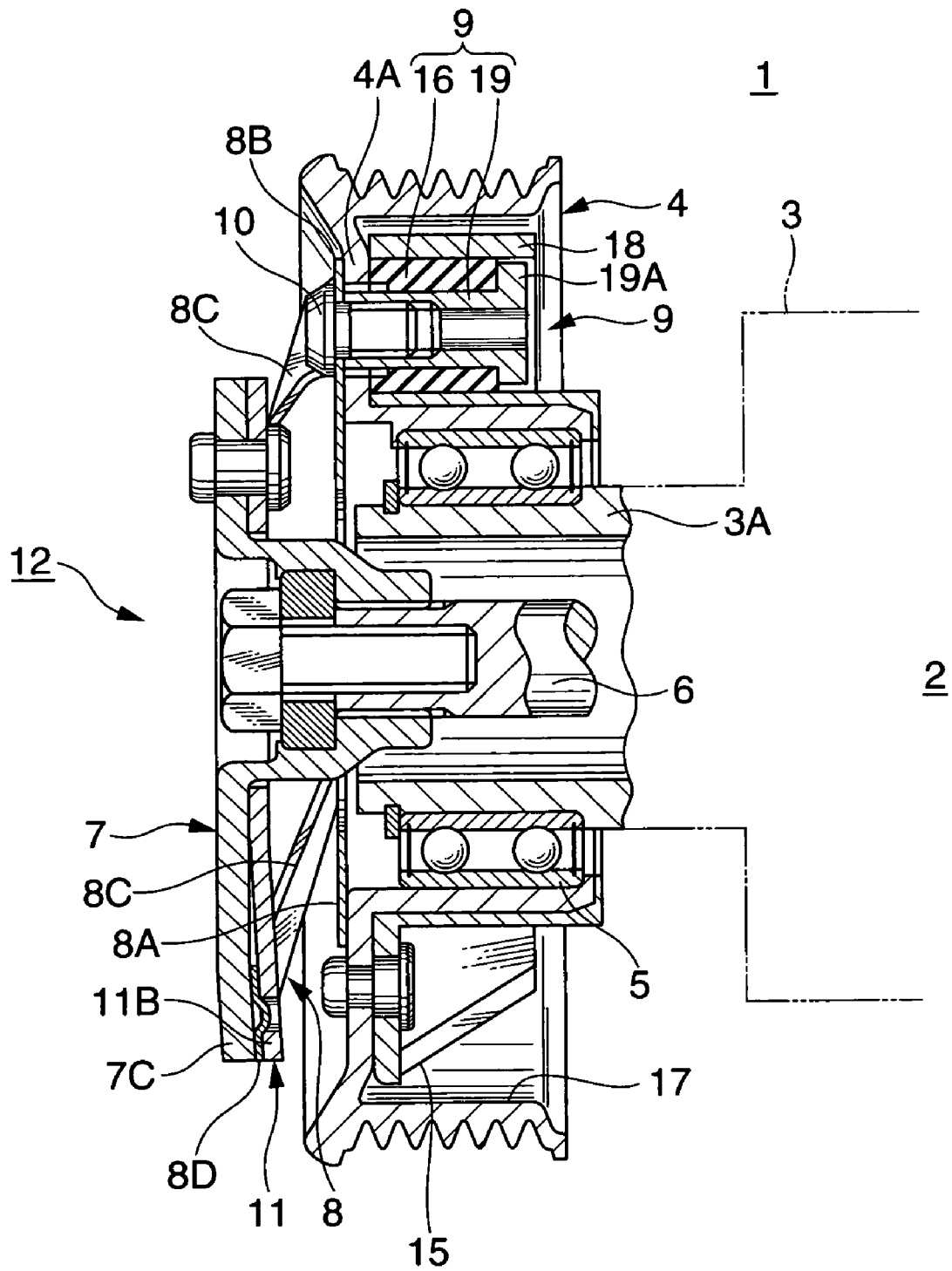
FIG. 16 is a sectional view of a conventional power transmission apparatus.

A power transmission apparatus according to the first embodiment of the present invention will be described with reference to FIGS. 1 to 6. The same constituent components and portions as those in FIG. 16 which shows the prior art are denoted by the same reference numerals, and a description thereof will not be repeated.

Figure 1:
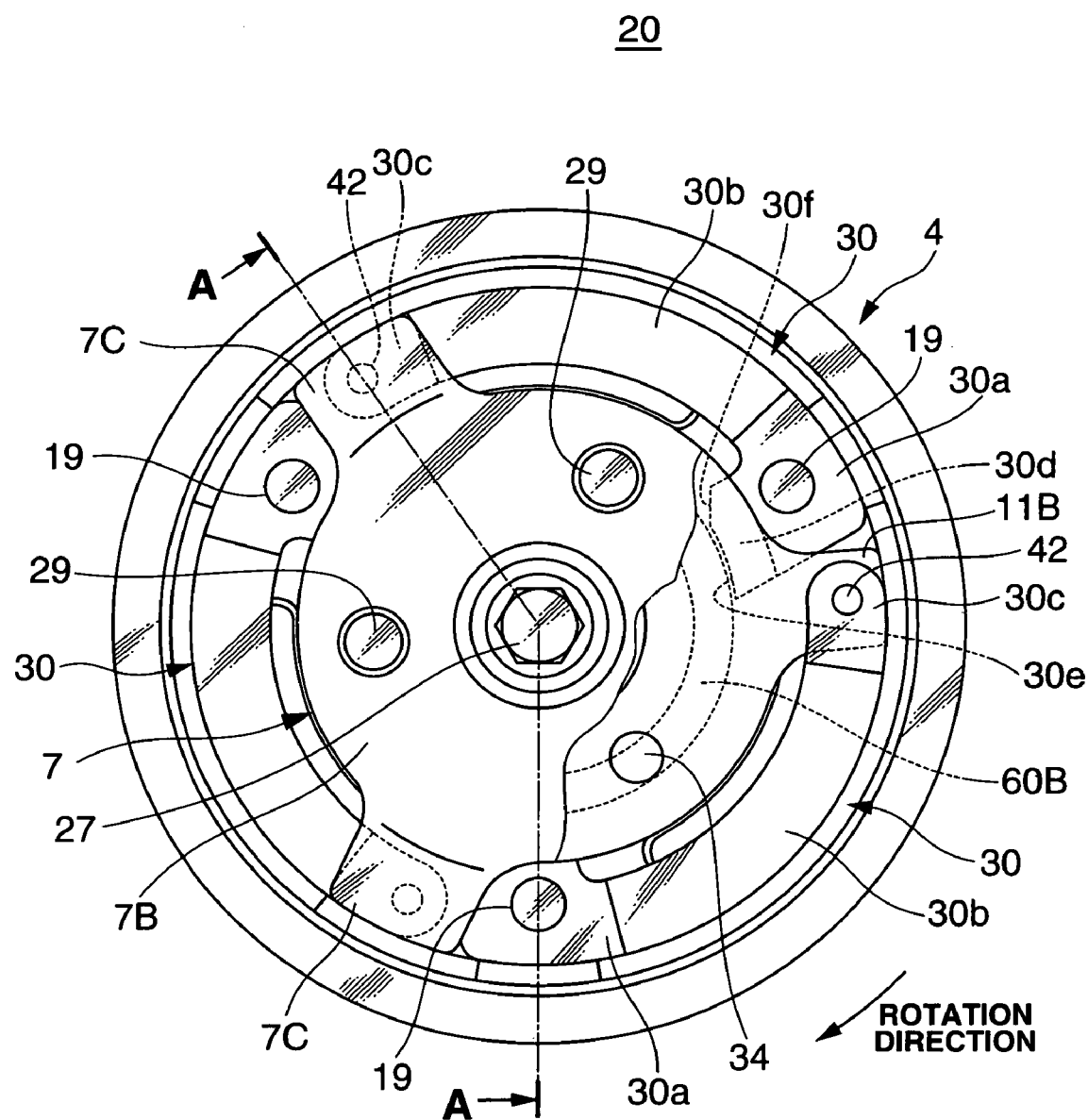
FIG. 1 is a partially cutaway front view of a power transmission apparatus according to the first embodiment of the present invention.
Figure 2:
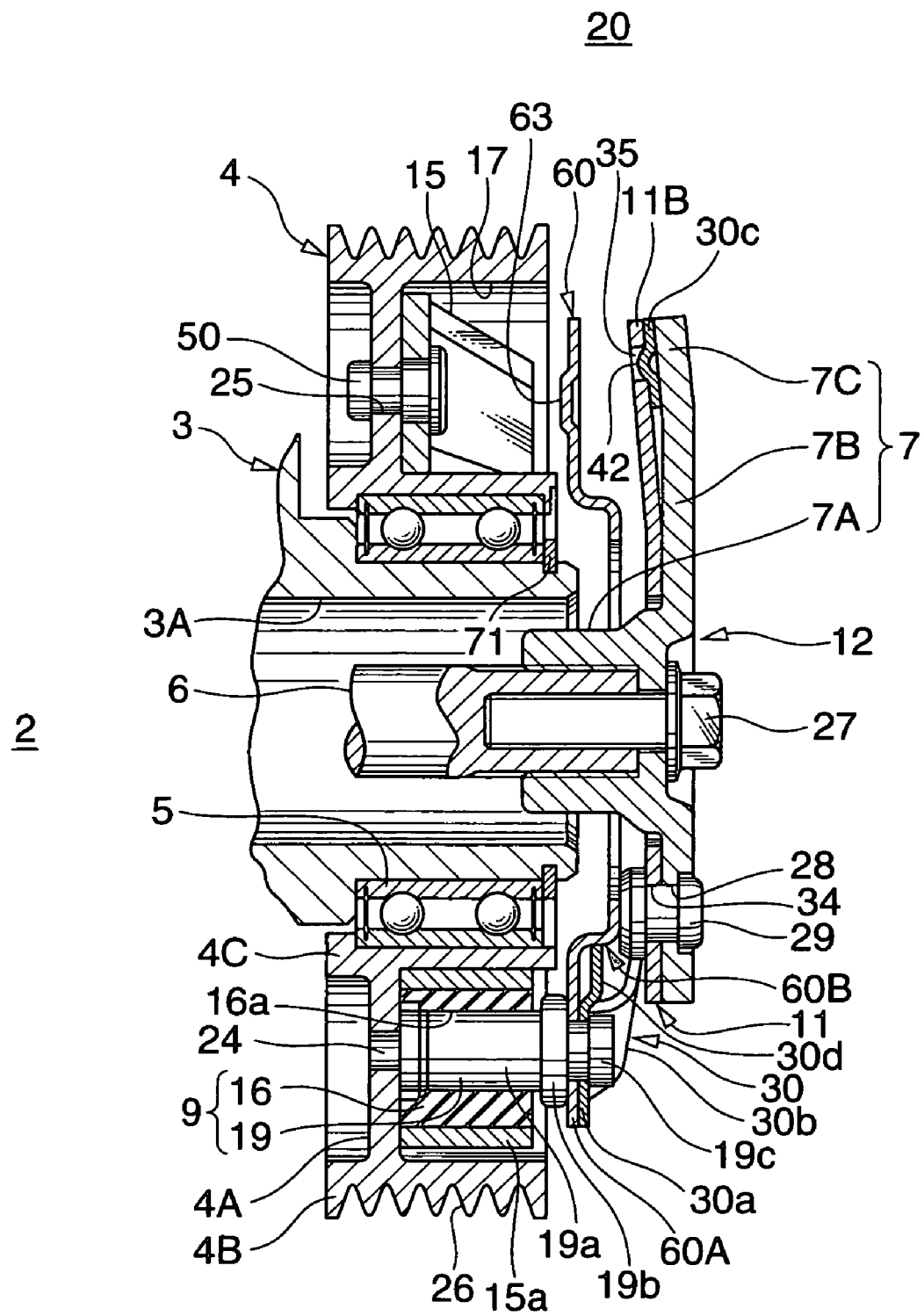
FIG. 2 is a sectional view taken along the line A-A of FIG. 1.
Figure 3:
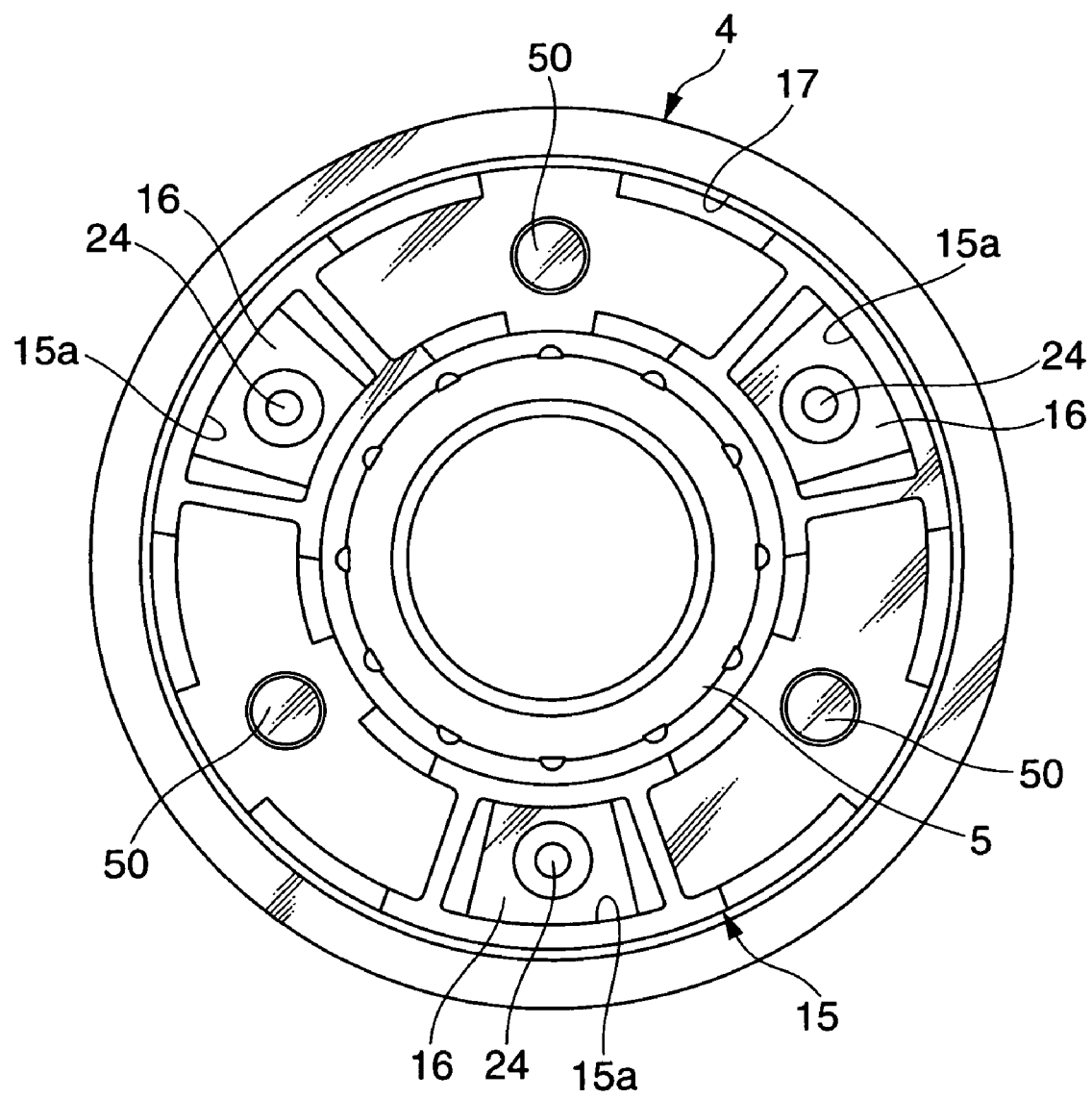
FIG. 3 is a front view of a pulley shown in FIG. 2.

Referring to FIGS. 1 and 2, a power transmission apparatus 20 is mounted on a rotating shaft 6 of a compressor 2 for an automobile air conditioner as a driven device, and transmits power of a driving device (engine) to the compressor 2 to drive it. The power transmission apparatus 20 also operates as a torque limiter which disconnects power transmission to the compressor 2 when an overload acts on the compressor 2.

A pulley 4 serving as a driving rotary body is integrally formed by injection molding of a phenol resin, aluminum, or the like to comprise a disc plate 4A, and an outer cylindrical portion 4B and inner cylindrical portion 4C which respectively project on the outer and inner surfaces of the disc plate 4A. The disc plate 4A, outer cylindrical portion 4B, and inner cylindrical portion 4C form an annular recess 17 which opens forward. The disc plate 4A is formed on the rear side of the center of the pulley 4 in the back-and-forth direction. Two types of insertion holes, i.e., three small insertion holes 24 and three large insertion holes 25, are alternately formed in the disc plate 4A equiangularly in the circumferential direction. Of these insertion holes, the small-diameter insertion holes 24 are air vent holes formed to correspond to damper mechanisms 9.

The large-diameter insertion holes 25 are holes where rivets 50 for fixing a damper holding member 15 are to be respectively inserted. The outer cylindrical portion 4B has a plurality of V-grooves 26 formed in its outer surface. A V-belt (not shown) is placed in the V-grooves 26 to transmit power of the automobile engine. A cylindrical portion 3A formed in a housing 3 of the compressor 2 rotatably, axially supports the inner cylindrical portion 4C through a bearing 5.

One end of the rotating shaft 6 of the compressor 2 projects outwardly from the cylindrical portion 3A of the housing 3. A bolt 27 fixes a hub 7 to this projecting end of the rotating shaft 6.

The hub 7 integrally comprises a boss 7A which is splinefitted to the shaft end of the rotating shaft 6, and a disc-like flange 7B which extends from the boss 7A outward in the radial direction. The flange 7B has three insertion holes 28 formed on the same circumference equiangularly in the circumferential direction. Rivets 29 inserted in the respective insertion holes 28 attach a holding plate 11 to the lower surface of the flange 7B. Three holding portions 7C which releasably hold connecting portions 30c of rotation transmission members 30 (to be described later) together with the holding plate 11 integrally project from the outer periphery of the flange 7B equiangularly in the circumferential direction.

As shown in FIG. 4A, the holding plate 11 is formed of a spring steel plate or the like into a disc-like shape with an appropriate thickness and comprises a ring-like main body 11A. Three holding portions 11B integrally project from the outer periphery of the main body 11A equiangularly in the circumferential direction. The main body 11A has three through holes 34 to correspond to the insertion holes 28 of the hub 7. Each holding portion 11B has a locking hole 35 at its center. The locking hole 35 engages with an engaging portion 42 projecting from the connecting portion 30c of the rotation transmission member 30 to prevent the connecting portion 30c from being released in the circumferential direction. As shown in FIG. 4B, the holding portion 11B is bent toward the pulley 4 at a required angle to decrease torsional deformation caused by the fluctuations of the load of the rotation transmission member 30. The hub (driven rotary member) 7 and holding plate 11 constitute a driven rotary body 12.

Figure 5A:
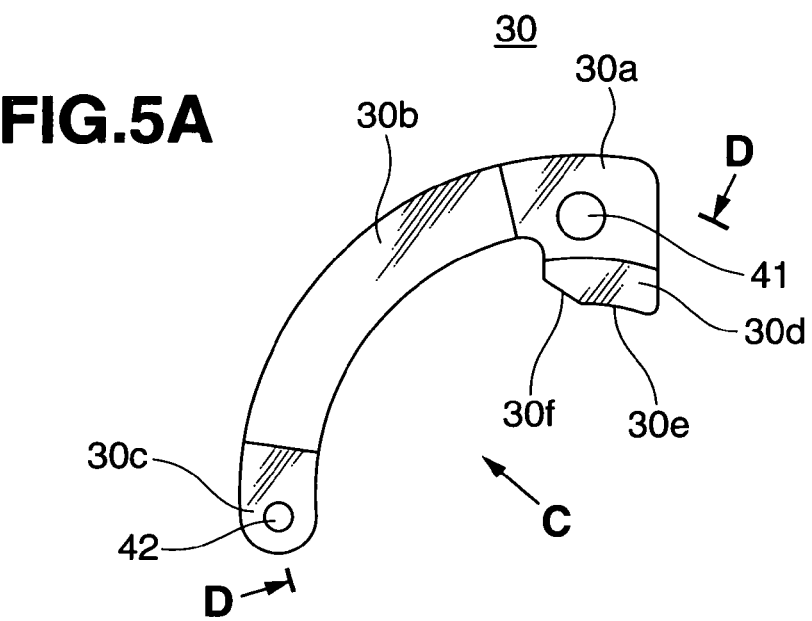
FIG. 5A is a front view of a rotation transmission member shown in FIG. 2.

As shown in FIG. 5A, the rotation transmission member 30 which is interposed between the pulley 4 and driven rotary body 12 to releasably connect them is formed of a thin spring steel plate or the like to have an almost arcuate shape, when seen from the front. The rotation transmission member 30 comprises a fixing portion 30a which is fixed to the damper mechanism 9 together with a preset load setting member 60 (to be described later), an arcuate connecting portion 30b extending from the fixing portion 30a, the connecting portion 30c extending from the distal end of the connecting portion 30b, and a pivot limiting portion 30d extending from the inner edge of the fixing portion 30a toward the center. An insertion hole 41 which receives a caulking portion 19c (FIG. 2) of a connecting member 19 of the damper mechanism 9 is formed at the center of the fixing portion 30a.

Figure 5B:
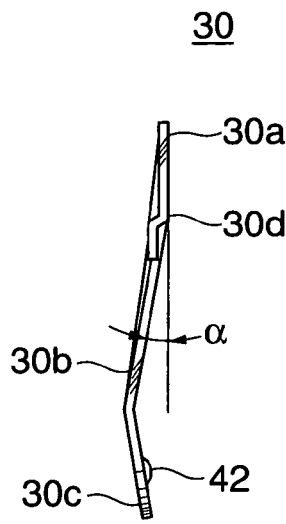
FIG. 5B is a side view seen from an arrow C in FIG. 5A.
Figure 5C:
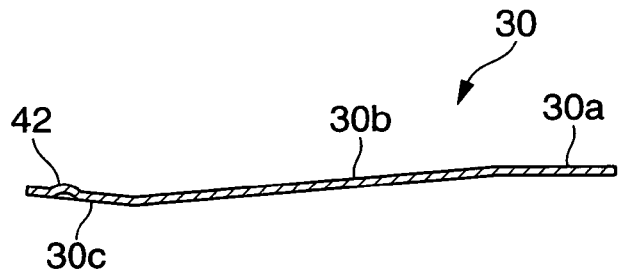
FIG. 5C is a sectional view taken along the line D-D of FIG. 5A.

The connecting portion 30b of the rotation transmission member 30 extends from an edge of the fixing portion 30a in a direction opposite to the rotational direction of the hub 7. As shown in FIGS. 5B and 5C, in the natural state, the connecting portion 30b is bent to the front surface at a predetermined angle α with respect to the fixing portion 30a.

The connecting portion 30c of the rotation transmission member 30 has a hemispherical engaging portion 42 which projects at the center of the lower surface of the connecting portion 30c to increase the strength of frictional connection with the holding plate 11. The connecting portion 30c is bent at a required angle in a direction (toward the pulley 4) opposite to the connecting portion 30b.

When an overload acts on the compressor 2 and the connecting portion 30c is released from the portion between the holding portions 7C and 11B of the hub 7 and holding plate 11, the pivot limiting portion 30d of the rotation transmission member 30 abuts against a regulating portion 60B of the preset load setting member 60 to limit outward pivot motion of the rotation transmission member 30 caused by the centrifugal force. An inner edge 30e of the pivot limiting portion 30d is formed into an arcuate surface which is recessed when seen from the above. A relief portion 30f is formed on the inner edge 30e at an end opposite to the rotational direction, i.e., at the rear end of the inner edge 30e. When the rotation transmission member 30 torsionally deforms during power transmission due to fluctuations in load, the rear end of the inner edge 30e does not come into contact with the regulating portion 60B of the preset load setting member 60 to rub the contact portion or generate noise due to the presence of the relief portion 30f. The relief portion 30f is formed by obliquely cutting off the rear end of the inner edge 30e at an angle of, e.g., 30°.

As shown in FIG. 1, three such rotation transmission members 30 are arranged equiangularly in the circumferential direction of the hub 7. Each fixing portion 30a is attached to the connecting member 19 of the corresponding damper mechanism 9 together with the preset load setting member 60. The holding portions 7C and 11B of the hub 7 and holding plate 11 separably hold the respective connecting portions 30c.

The damper holding member 15 has three storing portions 15a equally distributed in the circumferential direction. The damper mechanisms 9 are stored in the respective storing portions 15a. The storing portions 15a respectively communicate with air vent holes 24 formed in the disc plate 4A of the pulley 4.

Each damper mechanism 9 comprises a rubber damper 16 serving as an elastic member and the connecting member 19, and is disposed in the annular recess 17 of the pulley 4 through the damper holding member 15.

The rubber damper 16 forms a cylinder with two open ends and is fixed in the corresponding storing portion 15a of the damper holding member 15 with an adhesive, by baking, or the like. The connecting member 19 comprises a cylindrical main body 19a pressed into a central hole 16a of the rubber damper 16 to be movable forward/backward, a disc plate-like flange 19b integrally formed at the front end of the main body 19a, and the small-diameter cylindrical caulking portion 19c projecting at the center of the front surface of the flange 19b. The caulking portion 19c is inserted in an insertion hole 41 formed in the preset load setting member 60 and an insertion hole 62 formed in the fixing portion 30a of the rotation transmission member 30 from the lower surface, and its projecting end is caulked, thereby fixing the preset load setting member 60 and the fixing portion 30a of the rotation transmission member 30 to the connecting member 19. In other words, the connecting member 19 is fixed to the rotation transmission member 30 and preset load setting member 60 by caulking to connect them to each other.

Figure 6A:
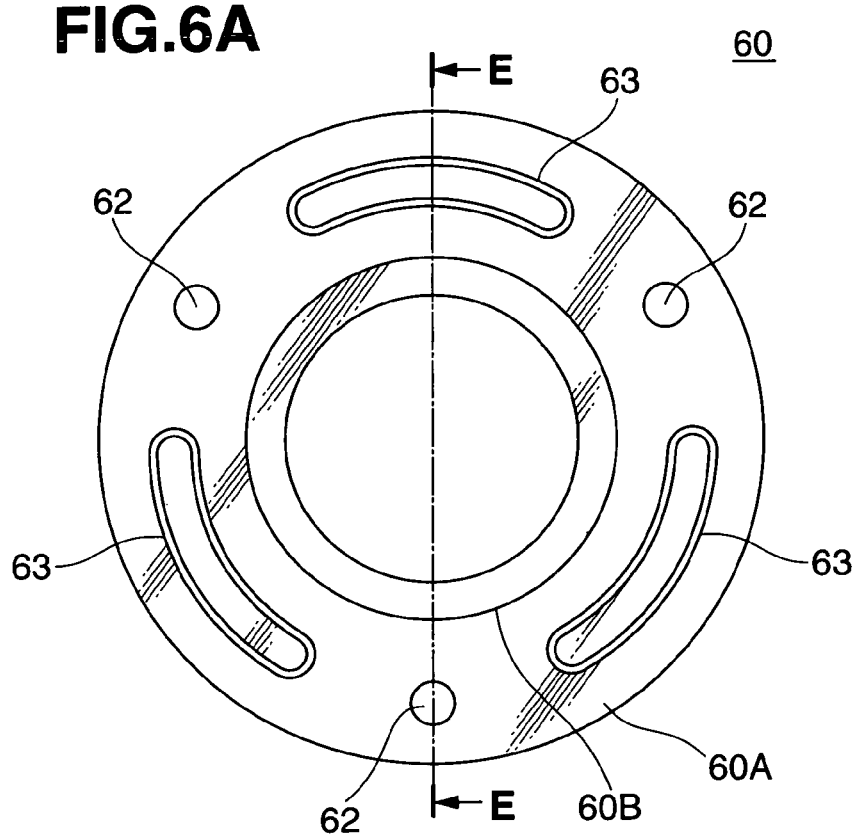
FIG. 6A is a front view of a preset load setting member shown in FIG. 2.

The preset load setting member 60 formed by pressing a metal plate is attached between the driven rotary body 12 and connecting member 19. As shown in FIG. 6A, the preset load setting member 60 comprises a disc plate-like main body 60A, and the regulating portion 60B formed on the inner periphery of the main body 60A by extrusion and comprising an annular projecting ridge.

The three insertion holes 62 and three ribs 63 are alternately formed in the main body 60A equiangularly in the circumferential direction. The insertion holes 62 are holes in which the caulking portions 19c of the connecting members 19 are to be inserted. The ribs 63 are formed to reinforce the main body 60A, and are formed into arcs which are long in the circumferential direction to project to the lower side of the main body 60A.

Figure 6B:
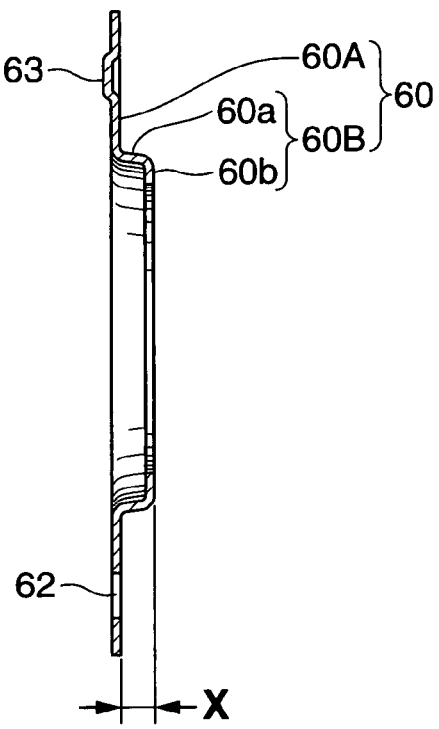
FIG. 6B is a sectional view taken along the line E-E of FIG. 6A.
Figure 7:
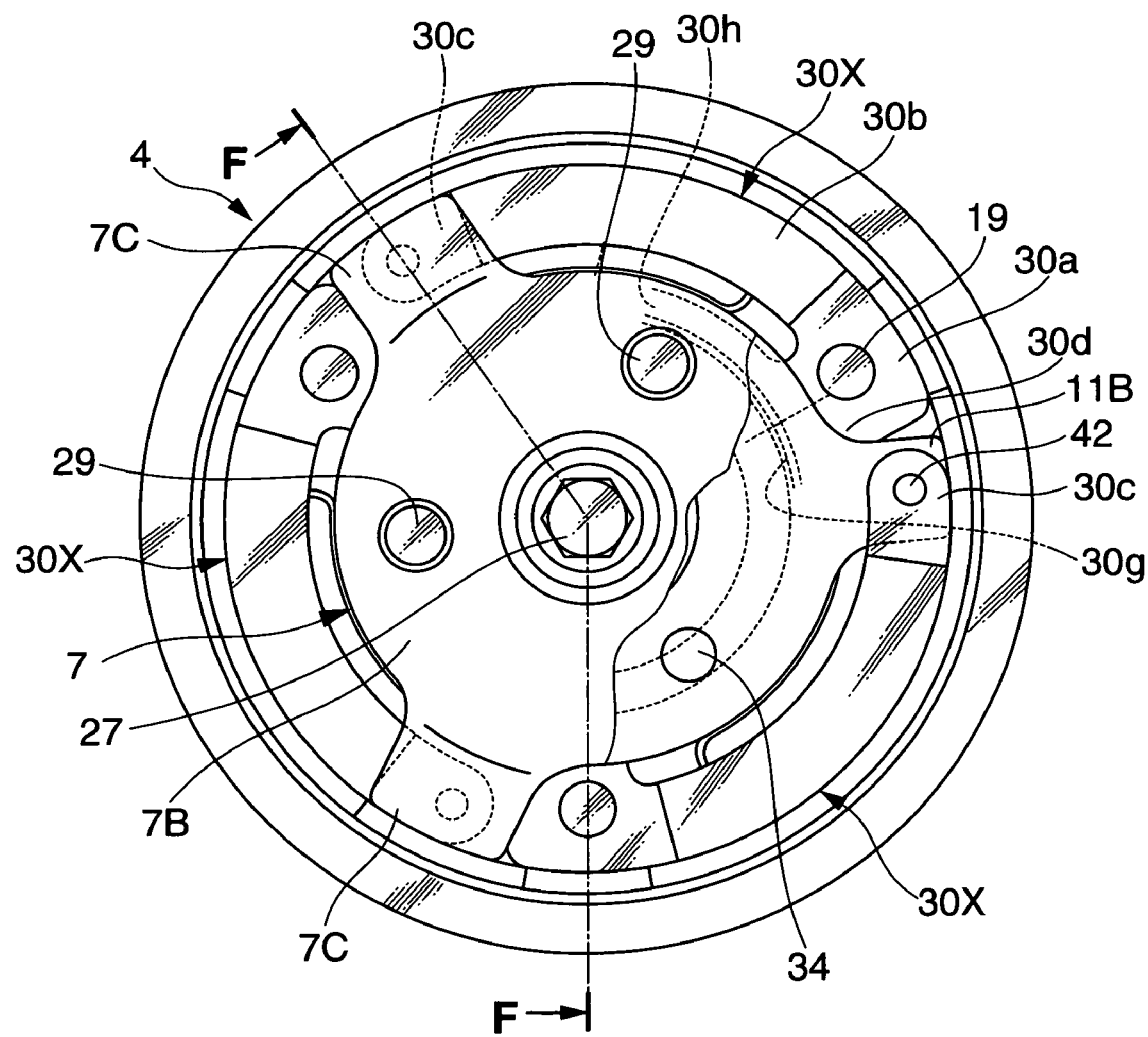
FIG. 7 is a partially cutaway front view of a power transmission apparatus according to the second embodiment of the present invention.
Figure 8:
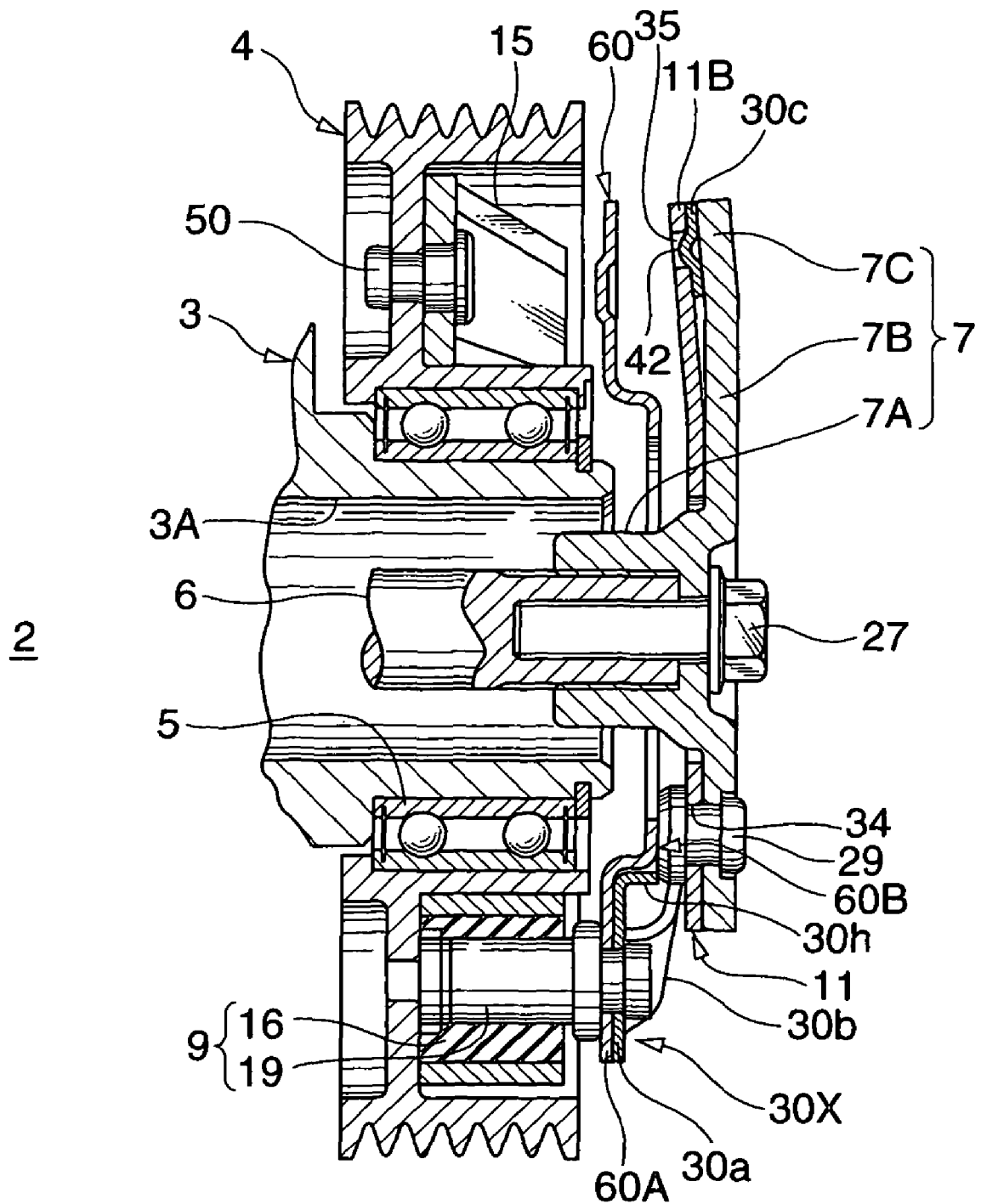
FIG. 8 is a sectional view taken along the line F-F of FIG. 7.

The regulating portion 60B regulates elastic restoration of the rotation transmission members 30. As shown in FIG. 6B, the regulating portion 60B comprises an annular upright wall 60a which rises from the inner peripheral edge of the main body 60A to the front side, and a disc plate 60b which is formed by plastically deforming the distal end of the upright wall 60a toward the center. The outer peripheral surface of the upright wall 60a closely opposes the inner edge 30e of the pivot limiting portion 30d of the rotation transmission member 30. A height X of the upright wall 60a is set at such a value that a predetermined preset load can be applied to the connecting portion 30b so that the connecting portion 30b of the rotation transmission member 30 can be elastically restored instantaneously when an overload acts on the compressor 2 and the connecting portion 30c of the rotation transmission member 30 is released from the portion between the holding portions 7C and 11B of the hub 7 and holding plate 11.

More specifically, the rotation transmission member 30 must be interposed between the damper mechanism 9 and driven rotary body 12 with its connecting portion 30b being elastically deformed. Then, upon generation of an overload, when the connecting portion 30c is released from the portion between the holding portions 7C and 11B of the hub 7 and holding plate 11, the elastic restoration force of the connecting portion 30b can quickly move the connecting portion 30c to the rear side of the holding plate 11 (in order to prevent interference of the connecting portion 30c with the holding plate 11). When attaching the preset load setting member 60 to the connecting member 19, if the connecting portion 30b is elastically deformed toward the hub 7 and the disc plate 60b of the regulating portion 60B is pressed against the rivets 29 by the elastic restoration force of the rotation transmission member 30, a preset load corresponding to the elastic deformation amount of the connecting portion 30b is applied to the rotation transmission member 30.

Hence, the rubber damper 16 and connecting member 19 need not be integrally connected to each other, and the connecting member 19 can be engaged in the rubber damper 16 to be movable forward/backward so that no thrust load is generated. Also, an almost constant gap can be held between the connecting member 19 and corresponding rivet 29. The preset load to be applied to the rotation transmission member 30 changes depending on the height X of the upright wall 60a. When the height X is large, the preset load increases. When the height X is small, the preset load decreases. The connecting portion 30b is not elastically restored unless the connecting portion 30c is released from the portion between the holding portions of the hub 7 and holding plate 11.

The preset load setting member 60 connects the connecting members 19 of all of the three damper mechanisms 9. Hence, the preset load setting member 60 also has the function of regulating the motions of the individual connecting members 19 and uniforming the loads applied to the fixing portions 30a of the respective rotation transmission members 30.

When assembling the power transmission apparatus 20 having the above structure, the damper holding member 15 is stored in the annular recess 17 and fixed to the disc plate 4A with the rivets 50. The rubber dampers 16 are built into the respective storing portions 15a of the damper holding member 15 in advance.

Subsequently, the pulley 4 with the built-in rubber dampers 16 is rotatably attached to the cylindrical portion 3A of the housing 3 through the bearing 5. A retaining ring 71 prevents the bearing 5 from coming out from the cylindrical portion 3A.

Subsequently, the hub 7, holding plate 11, connecting members 19, rotation transmission members 30, and preset load setting member 60 are integrated. To integrate these members, first, the rotation transmission members 30 and holding plate 11 are laid on the lower surface of the flange 7B of the hub 7. The connecting portions 30c of the rotation transmission members 30 are held by the holding portions 7C and 11B of the hub 7 and holding plate 11, and the engaging portions 42 are engaged in the locking holes 35 of the holding plate 11. Then, the rivets 29 are inserted in the insertion holes 28 of the hub 7 and the through holes 34 of the holding plate 11 and caulked, thereby integrating the hub 7, holding plate 11, and rotation transmission members 30.

Subsequently, the connecting portions 30b of the rotation transmission members 30 are elastically deformed backward to lay the fixing portions 30a on the main body 60A of the preset load setting member 60, and the regulating portion 60B of the preset load setting member 60 is abutted against the rear end faces of the rivets 29. Thus, a preset load is applied to the rotation transmission members 30 to hold the connecting portions 30b in an elastically deformed state. In this state, the caulking portions 19c of the connecting members 19 are inserted in the insertion holes 62 of the preset load setting member 60 and the insertion holes 41 of the rotation transmission members 30 and caulked, thereby integrating the connecting members 19, rotation transmission members 30, and preset load setting member 60.

After integrally assembling the hub 7, holding plate 11, connecting members 19, rotation transmission members 30, and preset load setting member 60 in this manner, the boss 7A of the hub 7 is spline-fitted on the rotating shaft 6 and fixed to it with the bolt 27. The main bodies 19a of the connecting members 19 are slidably pressed into the central holes 16a of the rubber dampers 16. This completes the assembly of the power transmission apparatus 20.

In this power transmission apparatus 20, power from the engine is transmitted to the rotating shaft 6 through the pulley 4, rubber dampers 16, connecting members 19, rotation transmission members 30, and driven rotary body 12.

During power transmission, in the damper mechanism 9, the rubber damper 16 effectively absorbs the torque fluctuations or shock transmitted from the pulley 4 to the hub 7. Accordingly, the shock during power transmission and the torque fluctuations during power transmission that may not reach an overload decrease the tension acting on the connecting portion 30c of the rotation transmission member 30, and the connecting portion 30c does not come out from the portion between the hub 7 and holding plate 11.

When the rotating shaft 6 stops due to some reason, e.g., an overload acting on the compressor 2, the power of the automobile engine disengages the pulley 4 and hub 7 that have been connected by each rotation transmission member 30. More specifically, as the pulley 4 continues rotation even after the rotating shaft 6 stops, it is to continue rotating the rotation transmission member 30. Hence, when the tensile force accompanying rotation exceeds the holding force of the hub 7 and holding plate 11 for the connecting portion 30c of the rotation transmission member 30, the connecting portion 30c is released from the portion between the holding portions of the hub 7 and holding plate 11 to disengage the pulley 4 and hub 7 from each other. When the pulley 4 and hub 7 are disconnected, the rotation transmission member 30 returns to the natural state shown in FIGS. 5A and 5C because of the elastic restoration of the connecting portion 30b, and the connecting portion 30c is moved to the portion behind the holding plate 11 instantaneously. Therefore, once the connecting portion 30c is released, the rotation transmission member 30 and driven rotary body 12 do not interfere with each other, so that rotation transmission of the pulley 4 can be disconnected reliably.

The power transmission apparatus 20 having the above structure can prevent a thrust load. More specifically, as the connecting member 19 is engaged in the rubber damper 16 to be movable forward/backward, the elastic restoration force of the connecting portion 30b of the rotation transmission member 30 is not transmitted to the hub 7 or pulley 4. Hence, no thrust load is generated in the bearing 5 that axially supports the pulley 4 or the bearing (not shown) that axially supports the rotating shaft 6. This can decrease the rotational resistances of the bearings, thereby improving the durability and reliability of the power transmission apparatus 20.

When assembling the hub 7, holding plate 11, connecting members 19, rotation transmission members 30, and preset load setting member 60 in advance into one unit, as a preset load can be applied to the rotation transmission members 30, the power transmission apparatus 20 can be mounted easily, thus improving the assembling operability.

The regulating portion 60B of the preset load setting member 60 maintains the connecting members 19 and rivets 29 at the predetermined gap. Upon generation of an overload, even when the connecting portion 30c of the rotation transmission member 30 is released from the portion between the hub 7 and holding plate 11 and the connecting portion 30b is elastically restored, the connecting member 19 hardly moves in the axial direction with respect to the rubber damper 16. Therefore, the connecting member 19 need not be extracted from the rubber damper 16 or be formed long. When compared to the power transmission mechanism described in the above Japanese Laid-Open No. 2003-56595, the size of the apparatus can be shortened in the axial direction, so that the apparatus itself can be made with a low profile.

The rotation transmission member 30 is provided with the pivot limiting portion 30d. This can limit the pivot motion of the rotation transmission member 30 caused by the centrifugal force upon occurrence of an overload. More specifically, upon generation of an overload, if the connecting portion 30c of the rotation transmission member 30 is released from the portion between the holding portions of the hub 7 and holding plate 11, the centrifugal force pivots the rotation transmission member 30 about the fixing portion 30a as the center because the caulking fixing portion of the fixing portion 30a becomes loose, and the connecting portion 30b and connecting portion 30c are to jump outside the hub 7. If the fixing portion 30a of the rotation transmission member 30 is provided with the pivot limiting portion 30d, when the centrifugal force is to pivot the rotation transmission member 30 outward, the inner edge 30e of the pivot limiting portion 30d abuts against the upright wall 60a of the regulating portion 60B of the preset load setting member 60 to limit the outward pivot motion of the rotation transmission member 30. Hence, the rotation transmission member 30, particularly the fixing portion 30a, can be prevented from being deformed or broken.

Furthermore, as the rear end of the inner edge 30e of the pivot limiting portion 30d is provided with the relief portion 30f, when fluctuations in load torsionally deform the rotation transmission member 30, the inner edge 30e will not abut against the regulating portion 60B of the preset load setting member 60 to rub the regulating portion 60B. Therefore, no noise will be generated.

The second embodiment of the present invention will be described with reference to FIGS. 7 to 9C.

The structure of the second embodiment is completely the same as that of the first embodiment except for the use of a rotation transmission member 30X which is partly different in shape from the rotation transmission member 30 of the first embodiment described above. More specifically, according to the first embodiment, the relief portion 30f is formed at the rear end of the inner edge 30e of the pivot limiting portion 30d. This is aimed at avoiding the rear end of the pivot limiting portion 30d from abutting against the outer periphery of the regulating portion 60B of the preset load setting member 60 when the rotation transmission member 30 is torsionally deformed by load fluctuations during power transmission. According to the second embodiment, the rear end of a pivot limiting portion 30d itself of the rotation transmission member 30X is so designed as not to abut against a regulating portion 60B of a preset load setting member 60 during power transmission.

Figure 9A:
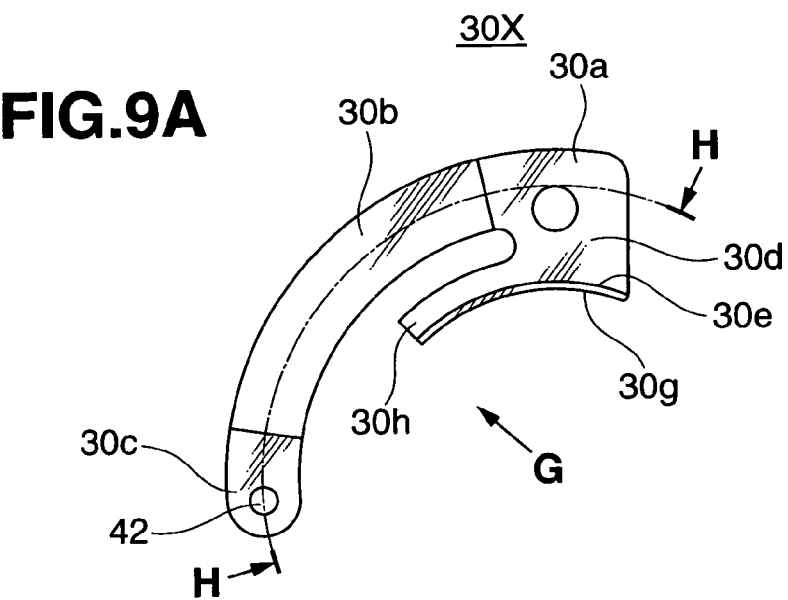
FIG. 9A is a front view of a rotation transmission member shown in FIG. 8.
Figure 9B:
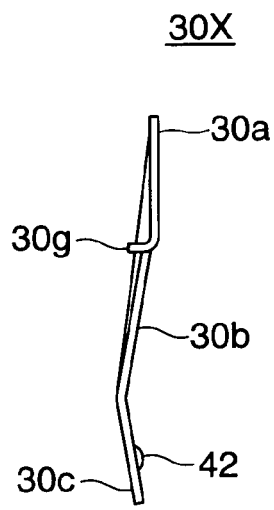
FIG. 9B is a side view seen from an arrow G in FIG. 9A.
Figure 9C:
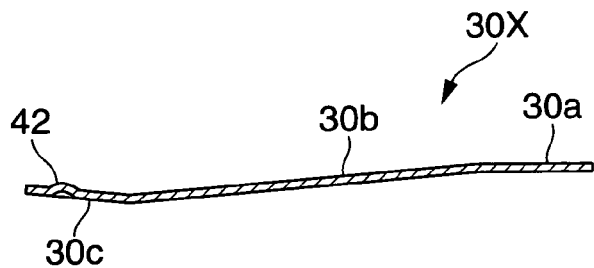
FIG. 9C is a sectional view taken along the line H-H of FIG. 9A.
Figure 10:
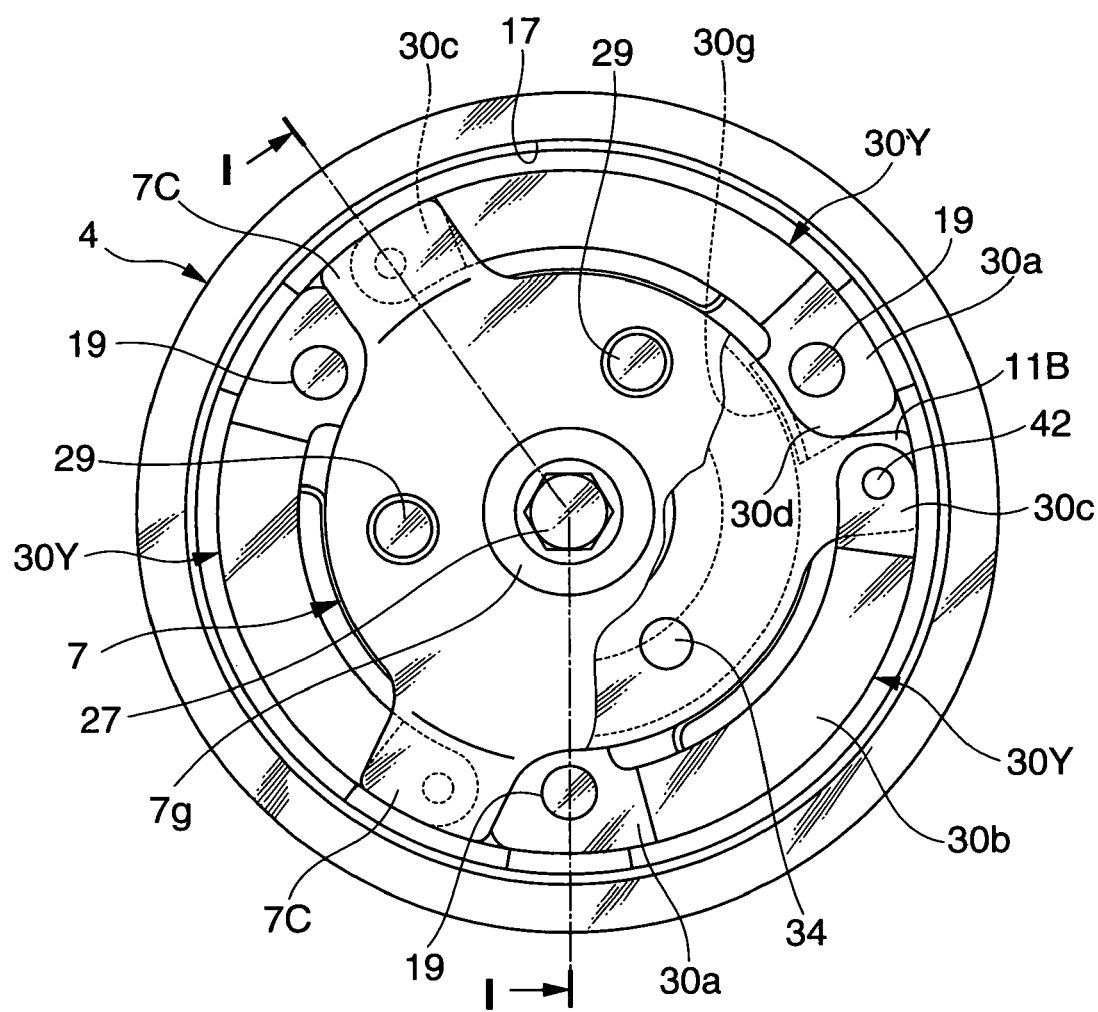
FIG. 10 is a partially cutaway front view of a power transmission apparatus according to the third embodiment of the present invention.
Figure 11:
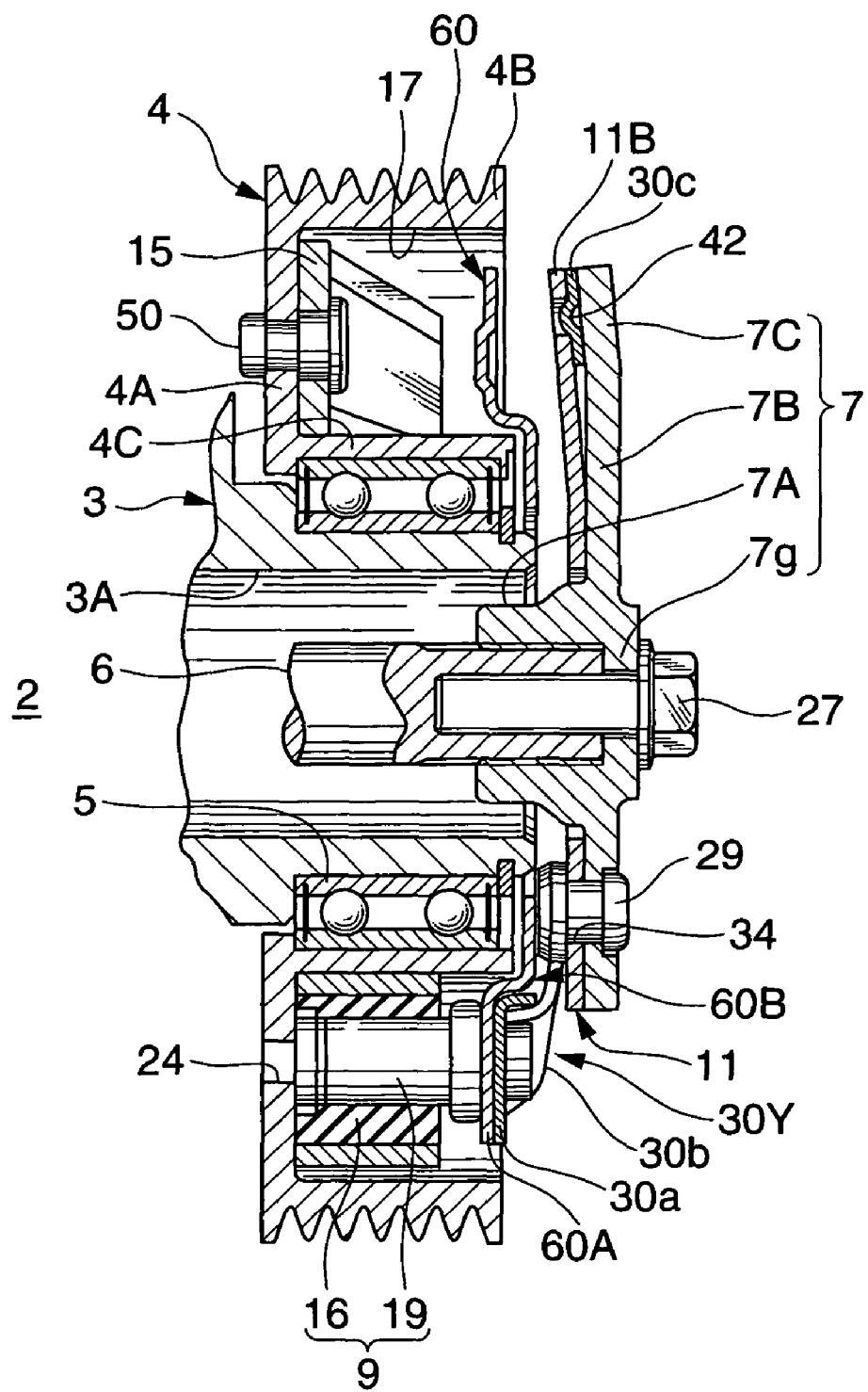
FIG. 11 is a sectional view taken along the line I-I of FIG. 10.

More specifically, as shown in FIGS. 9A to 9C, the rotation transmission member 30X is formed arcuately to integrally have a fixing portion 30a, connecting portion 30b, and connecting portion 30c. The pivot limiting portion 30d extends from the inner edge of the fixing portion 30a toward the center. A bent portion 30g is formed at an inner edge 30e of the pivot limiting portion 30d to be bent toward a hub 7. Also, an extending portion 30h continues from the rear end of the pivot limiting portion 30d to extend arcuately and oppose the connecting portion 30b in the radial direction. The bent portion 30g which is bent toward the hub covers the inner edge of the extending portion 30h as well. The bent portion 30g reinforces the fixing portion 30a, pivot limiting portion 30d, and extending portion 30h. The bent portion 30g closely opposes the outer periphery of the regulating portion 60B of the preset load setting member 60.

In a power transmission apparatus having the above rotation transmission member 30X, when power transmission is disconnected, the connecting portion 30c of the rotation transmission member 30X is released from the portion between the hub 7 and a holding plate 11. Thus, the centrifugal force pivots the rotation transmission member 30X about the fixing portion 30a as the center because the caulking fixing portion of the fixing portion 30a becomes loose, and the rotation transmission member 30X is to jump outward. At this time, the bent portion 30g covering from the pivot limiting portion 30d to the extending portion 30h abuts against the outer periphery of the regulating portion 60B of the preset load setting member 60 to prevent pivotal deformation of the rotation transmission member 30X that idles.

The torsional deformation of the rotation transmission member 30X caused by load fluctuations in power transmission is suppressed as the bent portion 30g abuts against the outer periphery of the regulating portion 60B of the preset load setting member 60 to elastically deform the extending portion 30h outward. Hence, the stress acting on the fixing portion 30a and connecting portion 30c of the rotation transmission member 30X during power transmission can also be decreased. This can suppress breakage of the fixing portion 30a and a decrease in frictional engaging force between the connecting portion 30c and the holding portions 7C and 11B of the hub 7 and holding plate 11.

The third embodiment of the present invention will be described with reference to FIGS. 10 to 12C.

Figure 12A:
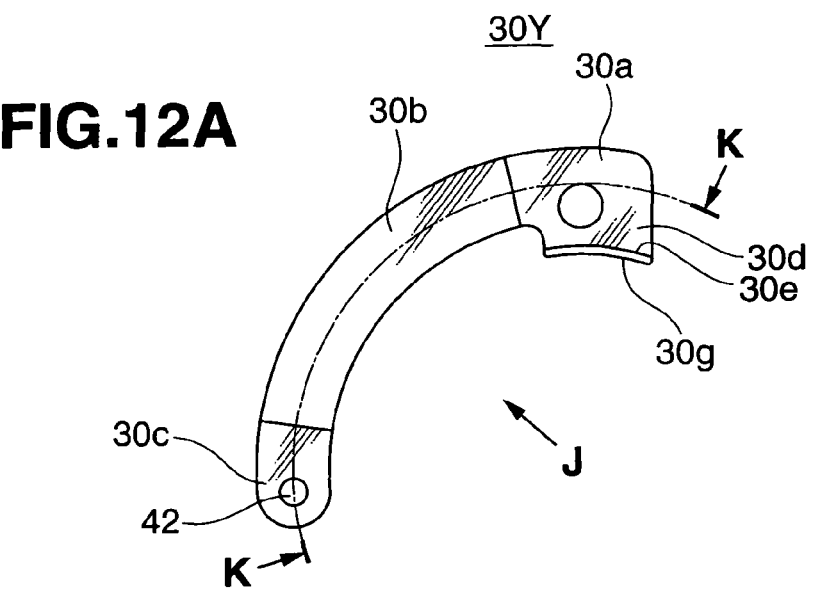
FIG. 12A is a front view of a rotation transmission member shown in FIG. 11.
Figure 12B:
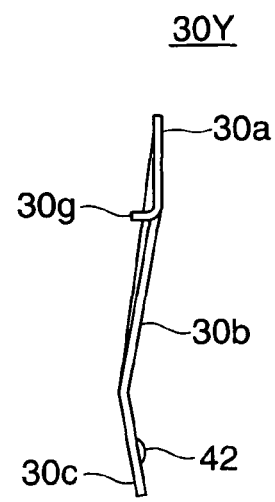
FIG. 12B is a side view seen from the direction of an arrow J in FIG. 12A.
Figure 12C:
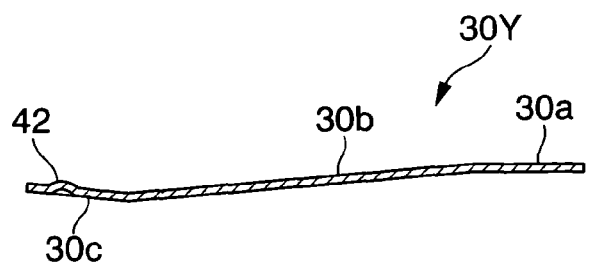
FIG. 12C is a sectional view taken along the line K-K of FIG. 12A.
Figure 13:
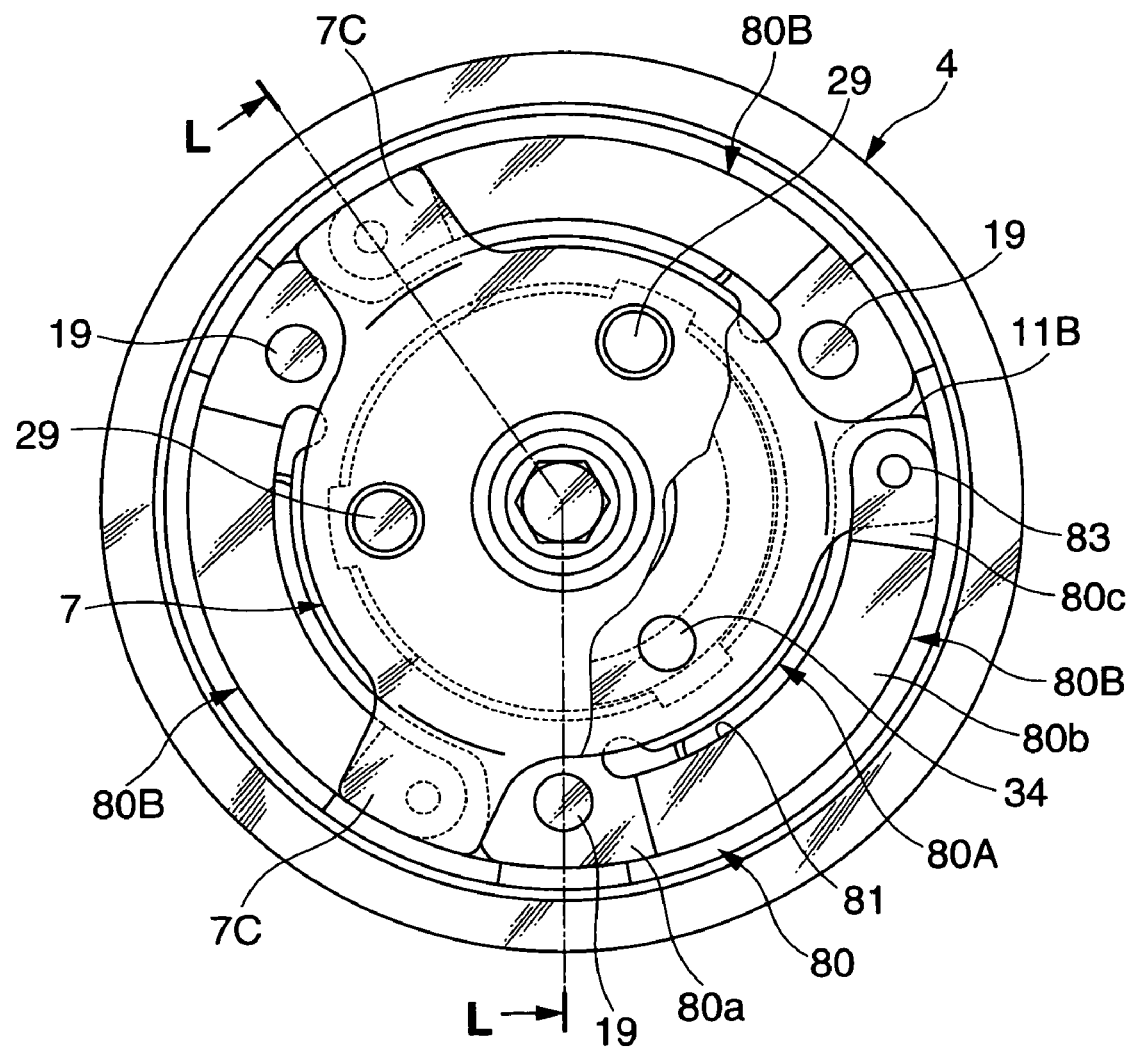
FIG. 13 is a partially cutaway front view of a power transmission apparatus according to the fourth embodiment of the present invention.
Figure 14:
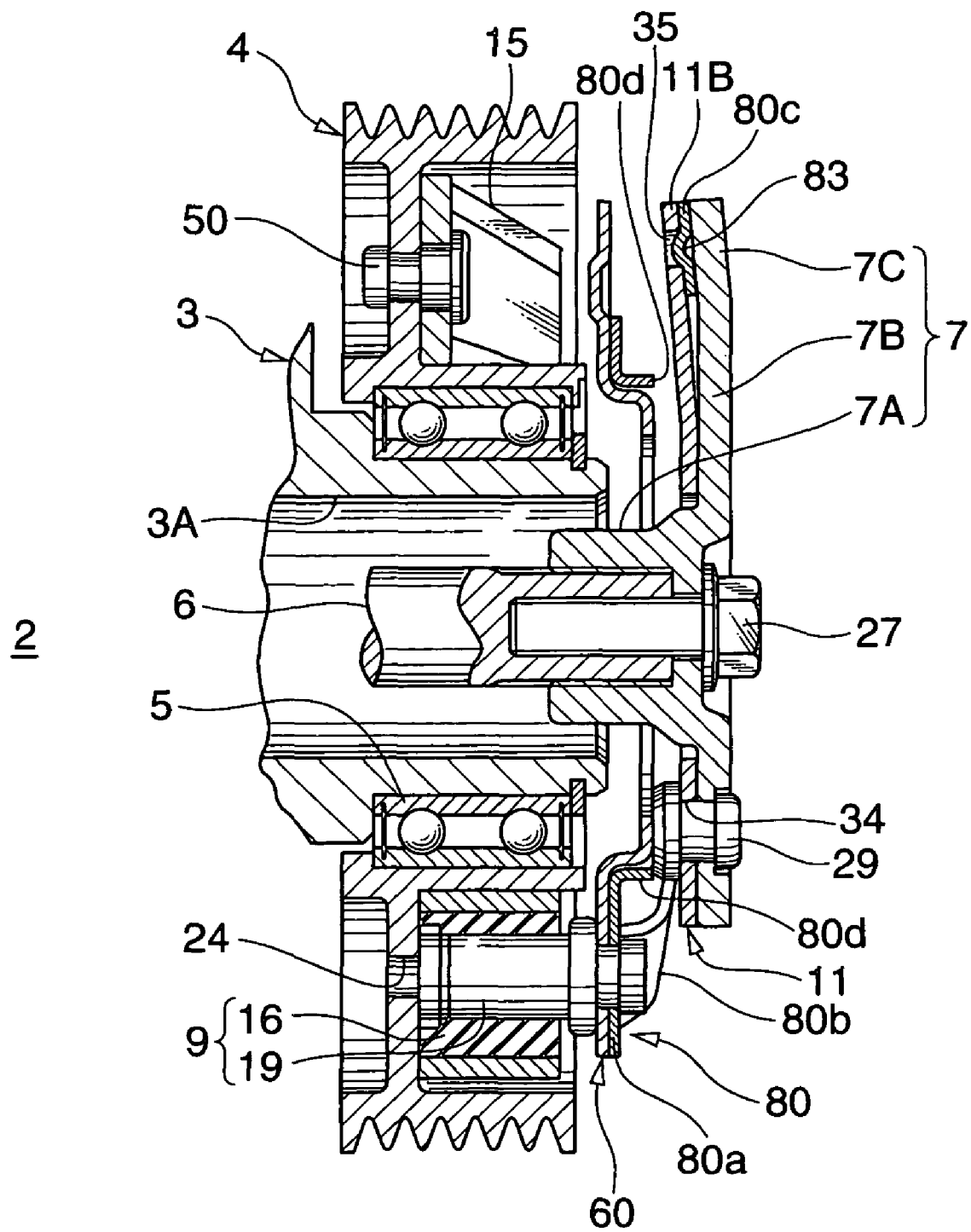
FIG. 14 is a sectional view taken along the line L-L of FIG. 13.

The third embodiment is different from the first and second embodiments in the following respects. More specifically, in the third embodiment, a disc plate 4A of a pulley 4 is arranged at the rear end (an end on a side opposite to a hub 7 side) of an outer cylindrical portion 4B and inner cylindrical portion 4C, and a deep annular recess 17 is formed. An abutting portion 7g of the hub 7 against which the distal end face of a rotating shaft 6 abuts is formed on the inner-diameter side of a flange 7B. Those portions of a rotation transmission member 30Y and preset load setting member 60 which are to be fixed by a connecting member 19 through caulking, more specifically, a fixing portion 30a of the rotation transmission member 30Y and a main body 60A of the preset load setting member 60 are located in the annular recess 17 of the pulley 4. The third embodiment is also different from the first and second embodiments in that, as shown in FIGS. 12A to 12C, an inner edge 30e of a pivot limiting portion 30d of the rotation transmission member 30Y is provided with a bent portion 30g which is bent toward the hub 7, but no relief portion or extending portion is formed.

According to the power transmission apparatus having the above structure, as those portions of the rotation transmission member 30Y and preset load setting member 60 which are to be fixed by the connecting member 19 through caulking are displaced toward the pulley 4 and stored in the annular recess 17, the power transmission apparatus in the axial direction can be shortened by an amount corresponding to this displacement.

The fourth embodiment of the present invention will be described with reference to FIGS. 13 to 15C.

In each of the first to third embodiments described above, the three rotation transmission members 30, 30×, or 30Y are arcuately formed and arranged in the circumferential direction of the hub 7. The fourth embodiment is different from the first to third embodiment in that, in place of forming the three arcuate rotation transmission members 30 (or 30X, or 30Y), three rotation transmission members are integrated to form one rotation transmission member 80. Except for this, the structure of the fourth embodiment is the same as those of the first to third embodiments.

Figure 15A:
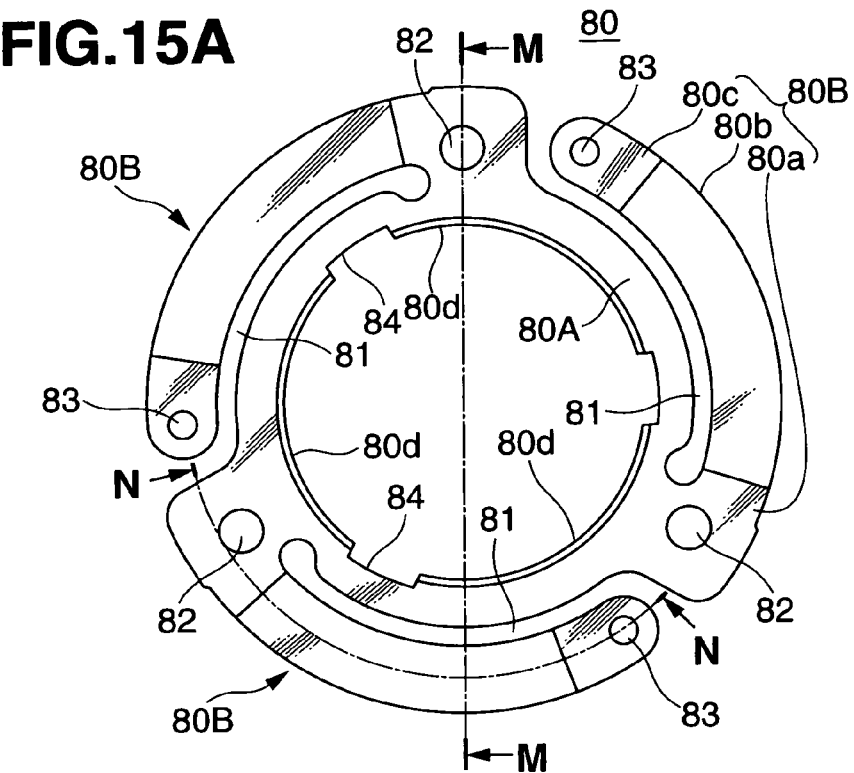
FIG. 15A is a front view of a rotation transmission member.

As shown in FIG. 15A, the rotation transmission member 80 is formed of a spring steel plate into an almost disc-like shape. The rotation transmission member 80 has three arcuate slits 81 and thus comprises an annular main body (pivot limiting portion) 80A located inside the slits 81, and three connecting pieces 80B extending arcuately to surround the perimeter of the main body 80A.

The inner edge of the main body 80A is provided with a bent portion 80d which is bent toward the front surface side (hub 7 side) and closely opposes the outer periphery of a regulating portion 60B of a preset load setting member 60. Notches 84 equally divide the bent portion 80d into three in the circumferential direction of the main body 80A. Thus, when the torsional deformation of the rotation transmission member 80 upon load fluctuations causes the bent portion 80d to abut against the regulating portion 60B, the bent portion 80d can be elastically deformed.

Figure 15B:
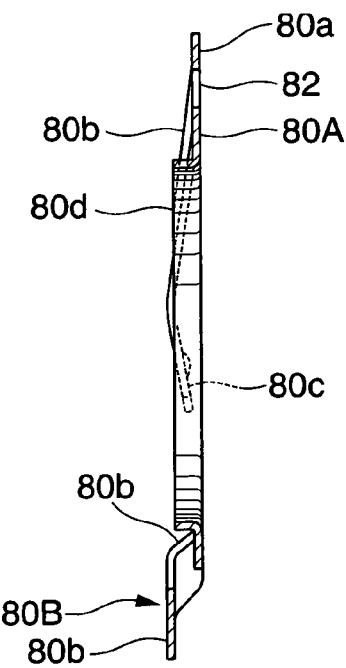
FIG. 15B is a sectional view taken along the line M-M of FIG. 15A.
Figure 15C:
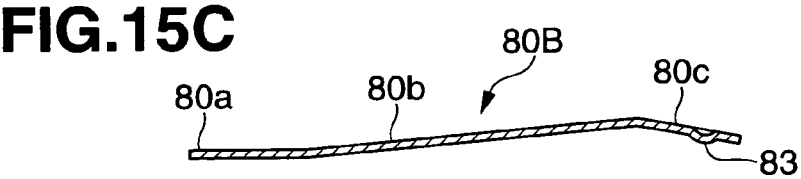
FIG. 15C is a sectional view taken along the line N-N of FIG. 15A.

In each connecting piece 80B, a proximal end (an end of the rotation transmission member 80 in the rotational direction) forms a fixing portion 80a which is to be fixed to a damper mechanism 9. An arcuate portion extending from the fixing portion 80a in the counter-rotational direction forms a connecting portion 80b which can be deformed in the direction of thickness. The distal end (an end in the counter-rotational direction) of the connecting portions 80b forms a connecting portion 80c which is to be releasably held by a hub 7 and holding plate 11. The fixing portion Boa is flush with the main body 80A, and has an insertion hole 82 in which a connecting member 19 of the damper mechanism 9 is to be inserted. As shown in FIGS. 15B and 15C, in the natural state, the connecting portion 80b is bent at a required angle toward the front surface (hub 7 side). A small arcuate engaging portion 83 projects on the lower surface of the connecting portion 80c to increase the frictional connecting force between the hub 7 and holding plate 11.

According to a power transmission apparatus comprising the above structure, as the rotation transmission member 80 comprises one member, the number of components can be decreased.

In the first to fourth embodiments described above, the regulating portion 60B is formed in the preset load setting member 60 by drawing. The regulating portion 60B is abutted against the rivet 29 which connects the hub 7 and holding plate 11 to each other. This elastically deforms the connecting portion 30b (80b) of the rotation transmission member 30 (30X, 30Y, or 80), thereby applying a preset load. However, the preset load setting member is not limited to this, and can have any other structure. For example, the preset load setting member 60 may form a flat plate, and any one of the hub 7 and holding plate 11 which constitute the driven rotary body 12 may be provided with a regulating portion which projects toward the pulley 4 to abut against the preset load setting member. More specifically, the preset load setting member can be constituted by two members as far as they do not interfere with a rotation transmission member in the rotational direction when, upon generation of an overload, the connecting portion 30b (80b) of the rotation transmission member 30 (30X, 30Y, or 80) comes out from the portion between the holding portions of the hub 7 and holding plate 11 and the connecting portion 30b of the rotation transmission member 30 is elastically restored.

As has been described above, according to the present invention, the connecting member is engaged in the elastic member to be movable forward/backward. Thus, the elastic restoration force of the connecting portion of the rotation transmission member does not act as a thrust load on the bearing that axially supports the driven rotating shaft or driving rotary body. Thus, the rotational resistance of the bearing can be decreased.

When an overload acts, the connecting member need not be extracted from the elastic member. Thus, the connecting member need not be formed longer than necessary, so that the size of the apparatus in the axial direction can be decreased.

As the driven rotary body, connecting member, rotation transmission member, and preset load setting means are integrally mounted, a preset load can be applied to the rotation transmission member. In this state, if the driven rotary body is mounted on the rotating shaft of a driven device and the connecting member is engaged in the elastic member, the assembling operation becomes easy.

The fixing portion of the rotation transmission member is provided with the pivot limiting portion. Upon generation of an overload, when the connecting portion of the rotation transmission member is released from the driven rotary body, the pivot limiting portion abuts against the regulating portion of the preset load setting means. This can limit the outward pivot motion of the rotation transmission member caused by a centrifugal force.

The pivot limiting portion of the rotation transmission member is provided with the relief portion. When load fluctuations during power transmission torsionally deform the rotation transmission member, the pivot limiting portion will not abut against the preset load setting means to rub it.

The bent portion formed on the pivot limiting portion reinforces the rotation transmission member. The bent portion abuts against the regulating portion to limit the pivot motion of the rotation transmission member caused by the centrifugal force.

What is claimed is:

1. A power transmission apparatus characterized by comprising:
    a driving rotary body which is rotated by power from a driving device;
    a driven rotary body including a driven rotary member attached to a rotating shaft of a driven device and a holding plate attached to said driven rotary member;
    a damper mechanism including a cylindrical elastic member attached to said driving rotary body and a connecting member which is engaged in said elastic member to be movable forward/backward;
    at least one rotation transmission member to which said connecting member is attached and which functions to transmit a rotation of said driving rotary body to said driven rotary body, said rotation transmission member having a fixing portion which is connected through said damper mechanism to said driving rotary body, a first connecting portion extending from said fixing portion and elastically deformable in the thickness direction, and a second connecting portion extending from a distal end of said first connecting portion and separably connected to said driven rotary body-and
    a preset load setting member mounted between said driven rotary body and said connecting member to elastically deform said first connecting portion of said rotation transmission member, thus applying a preset load;
    wherein said preset load setting member is fixed to said connecting member together with said rotation transmission member and includes a regulating portion which regulates elastic restoration of said first connecting portion of said rotation transmission member, and
    a preset load is applied to said first connecting portion of said rotation transmission member when said regulating portion is pressed against said driven rotary body.

2. An apparatus according to claim 1, wherein said rotation transmission member include three rotational transmission members integrated to form a single rotational transmission member.

* * * * *